A. H. MARKS.
VEHICLE TIRE.
APPLICATION FILED MAR. 26, 1906.
1,001,663.
Patented Aug. 29, 1911.
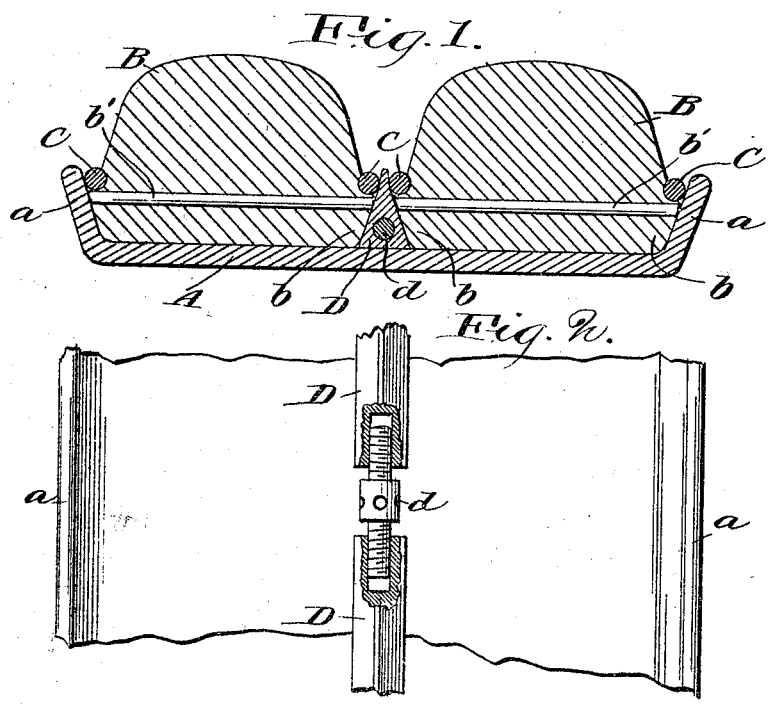
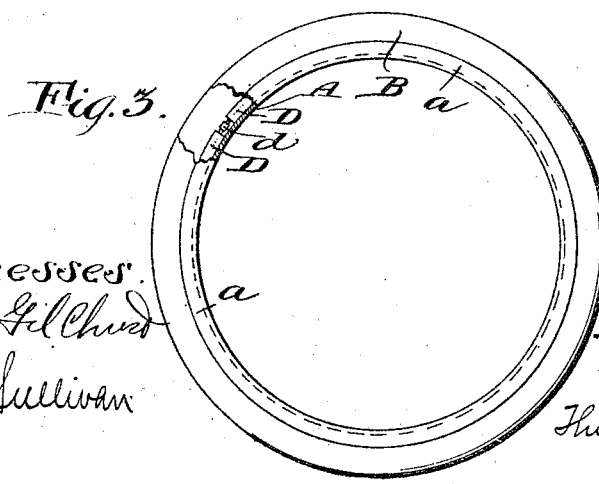

UNITED STATES PATENT OFFICE.

ARTHUR H. MARKS, OF AKRON, OHIO.

VEHICLE-TIRE.

1,001,663.

Specification of Letters Patent. Patented Aug. 29, 1911.

Application filed March 26, 1906. Serial No. 307,969.

*To all whom it may concern:*

Be it known that I, ARTHUR H. MARKS, a citizen of the United States, residing at Akron, in the county of Summit and State of Ohio, have invented a certain new and useful Improvement in Vehicle-Tires, of which the following is a full, clear, and exact description.

The use of solid rubber tires on vehicle wheels is increasing rapidly; and there are indications in the trade of a growing demand for such tires in sizes too large for the manufacturers to vulcanize properly in a reasonable time, and too large to be satisfactorily secured upon the wheel rim by any of the fastening devices heretofore employed for fastening rubber tires upon wheel rims. It is therefore impracticable to make, as well as to use such wide rubber tires as seem to be demanded. A fairly satisfactory substitute has, however, been suggested in what is sometimes called a twin tire, that is to say, a structure which broadly defined consists of two rubber tires vulcanized to a single base. Theoretically, this is an entirely satisfactory solution of the problem, because a twin tire furnishes more traction with less wear than a single tire of like weight. It has been found, however, that the twin tires in use are apt to be pulled loose from their common base unless the base and tire are formed with interlocking tongues and grooves, which latter construction is too expensive to be altogether satisfactory.

The advantage of my invention is to produce a twin tire by using two single tires of almost any of the well known constructions, in combination with a suitable rim, and means for holding said tires thereon. The resultant is less expensive than any construction of twin tires heretofore produced, is more durable, and is equally good in every respect. It will, moreover, commend itself to manufacturers because it does not put them to the necessity of building additional molds for the manufacture of twin tires.

The invention consists in the construction and combinations of parts hereinafter described and definitely pointed out in the claim.

In the drawing, Figure 1 is a transverse sectional view of the invention in an approved form; Fig. 2 is a plan view of a short section of the rim, and a ring thereon,—showing a means for contracting said ring upon the rim; and Fig. 3 is a side view of a wheel rim and tires constructed in accordance with the present invention.

Referring to the parts by letters, A represents a wheel rim; and *a a* represent flanges at the sides of said rim,—which flanges may be integral with the rim as shown in Fig. 1, although other structures may be used to accomplish the same purpose. On this rim are two vulcanized rubber tires B B which may be of well known construction. As shown in Fig. 1 these tires have laterally widened bases *b* which are widest a short distance outside of their inner peripheries. At the widest part of each tire, transverse metal rods *b'* are embedded at suitable intervals, said rods being in such position that the fastening devices, which may be wires, C, may engage upon said rods near their ends.

D represents a ring, which should preferably be made of metal, and is removably fitted upon rim A. This ring may be split; and any suitable means, as a right and left handed screw *d*, may be provided for tightening the ring upon the rim. In the best construction the side faces of this ring should conform in shape to the side faces of the base parts *b* of the two tires between which the ring lies, and with which it engages. Exact conformity in the shape of these engaging sides is not, however, absolutely essential. The ring D extends outward from the rim beyond the base part *b* of the tires, and consequently between the ends of the rods *b'*. Said ring then serves three functions, viz. it assists in preventing lateral movement of the tires upon the rim; it prevents lateral movement of the rods *b'* in the tires; and also prevents any such lateral movement of the fastening wires C as will allow them to disengage the tire bases.

The retaining devices may be wires or bands C applied in the ordinary way which is well understood in this art.

It is obvious that, with the construction hereinbefore described, one is not limited to the use of two tires upon the rim. Any required number may be employed in connection with a rim of suitable width, and rings D, of which one will be interposed between the approximate edges of adjacent tires.

Having described my invention, I claim:

The combination of a wheel rim, outwardly extended flanges at the sides thereof, and a plurality of rubber tires fitted upon said rim, with a split ring removably fitted upon said rim and lying between and in engagement with the approximate edges of the base portions of said tires; the side faces of said ring conforming in shape to the side faces of the tire bases with which said ring engages and fastening devices engaging upon both edges of each tire to hold said tires upon the rim, and means for contracting said ring in diameter while upon said rim.

In testimony whereof, I hereunto affix my signature in the presence of two witnesses.

ARTHUR H. MARKS.

Witnesses:
BESSIE C. LOOIE,
D. GALEHOUSE.